(12) United States Patent
Yano

(10) Patent No.: US 7,469,072 B2
(45) Date of Patent: Dec. 23, 2008

(54) IMAGE PROCESSING APPARATUS AND METHOD

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 10/887,817

(22) Filed: Jul. 12, 2004

(65) Prior Publication Data

US 2005/0012832 A1    Jan. 20, 2005

(30) Foreign Application Priority Data

Jul. 18, 2003 (JP) .......................... 2003-199119
Jul. 18, 2003 (JP) .......................... 2003-199122

(51) Int. Cl.
*G06K 9/40* (2006.01)

(52) U.S. Cl. .................................. 382/274

(58) Field of Classification Search ................ 382/118, 382/162–167, 232, 260, 272, 274–275; 358/521; 348/241
See application file for complete search history.

(56) References Cited

U.S. PATENT DOCUMENTS

| | | | |
|---|---|---|---|
| 6,507,358 B1 | 1/2003 | Mori et al. .................... 348/42 |
| 6,694,051 B1 | 2/2004 | Yamazoe et al. ............ 382/167 |
| 7,065,257 B2 * | 6/2006 | Soga et al. .................. 382/274 |
| 7,068,328 B1 | 6/2006 | Mino .......................... 348/672 |
| 7,082,211 B2 * | 7/2006 | Simon et al. ................ 382/118 |
| 7,167,597 B2 | 1/2007 | Matsushima ................ 382/274 |
| 7,260,267 B2 * | 8/2007 | Sugimoto ................... 382/266 |
| 7,315,657 B2 | 1/2008 | Matsushima ................ 382/274 |
| 2001/0005222 A1 | 6/2001 | Yamaguchi ................. 348/223 |
| 2002/0012126 A1 | 1/2002 | Nakamura .................. 358/1.9 |
| 2002/0081003 A1 * | 6/2002 | Sobol ......................... 382/118 |

(Continued)

FOREIGN PATENT DOCUMENTS

JP      11-191871      7/1999

(Continued)

OTHER PUBLICATIONS

Yang et al., "Detecting Faces in Images: A Survey," IEEE Transactions on Patten Analysis and Machine Intelligence, vol. 24, No. 1 (Jan. 2002).

(Continued)

*Primary Examiner*—Duy M Dang
(74) *Attorney, Agent, or Firm*—Fitzpatrick, Cella, Harper & Scinto

(57) ABSTRACT

An image processing apparatus comprises an extractor for extracting a brightness component from image data; a scale converter for obtaining a distribution of the brightness component on relatively large scale; a brightness component improver for improving the distribution of the brightness component of the image data by using the brightness component and an output of the converter; and an image reproducer for reproducing the image data by using an output of the improver as a distribution of a brightness component of a new image, wherein the apparatus further comprises a face detector for detecting a face area from the image data, and the improver adjusts a degree of improvement by using a distribution of a brightness component of the face area being an output of the detector. Thus, it is possible to automatically adjust the degree of improvement of the luminance distribution according to the image data to be processed.

10 Claims, 5 Drawing Sheets

U.S. PATENT DOCUMENTS

| | | |
|---|---|---|
| 2003/0020974 A1* | 1/2003 | Matsushima ................ 358/521 |
| 2003/0052979 A1* | 3/2003 | Soga et al. ................... 348/241 |
| 2003/0067620 A1 | 4/2003 | Masumoto et al. ......... 358/1.13 |
| 2003/0067638 A1 | 4/2003 | Yano .......................... 358/540 |
| 2003/0156196 A1 | 8/2003 | Kato et al. ............... 348/207.2 |
| 2004/0046990 A1 | 3/2004 | Yano et al. ................ 358/1.15 |
| 2006/0192898 A1 | 8/2006 | Mino ......................... 348/672 |

FOREIGN PATENT DOCUMENTS

| | | |
|---|---|---|
| JP | 11-195047 | 7/1999 |
| JP | 11-266358 | 9/1999 |
| JP | 2000-134467 | 5/2000 |
| JP | 2001-126075 | 5/2001 |
| JP | 2001-186323 | 7/2001 |
| JP | 2001-222710 | 8/2001 |
| JP | 2001-245153 | 9/2001 |
| JP | 2003-169231 | 6/2003 |

OTHER PUBLICATIONS

Durand et al., "Fast Bilateral Filtering for the Display of High-Dynamic-Range Images," acm Transactions on Graphics, vol. 21, No. 3 (Jul. 2002).

"Exchangeable Image File Format for Digital Still Camera Standard Exit Version 2.2," JEITA (Japanese Electronics and Information Technology Industries Association) (Undated/2002).

Jobson, et al., "A Multiscale Retinex for Bridging the Gap Between Color Images and the Human Observation of Scenes," IEEE Transactions on Image Processing, vol. 6, No. 7, Jul. 1997, pp. 965-976.

Reinhard et al., "Photographic Tone Reproduction for Digital Images," acm Transactions on Graphics, vol. 21, No. 3, Jul. 2002.

Moroney, "Local Color Correction Using Non-Linear Masking," IS&T/SID Eighth Color Image Conference, 2000, pp. 108-111.

Japanese Office Action dated Mar. 25, 2008, in Japanese Patent Application No. 2003-199119.

Japanese Final Office Action dated May 7, 2008, in Japanese Patent Application No. 2003-199122.

Japanese Office Action dated Dec. 18, 2007, in Japanese Patent Application No. 2003-199122.

* cited by examiner

EXTRACTED EYE CANDIDATE

CHECK LUMINANCE DIFFERENCE AND SIZE
CHECK ANGLE
CHECK DISTANCE

FORM RECTANGULAR AREA

JUDGE EDGE AND COLOR INFORMATION IN RECTANGULAR AREA

IMAGE PROCESSING APPARATUS AND METHOD

This application claims priority from Japanese Patent Application Nos. 2003-199119 filed on Jul. 18, 2003 and 2003-199122 filed on Jul. 18, 2003 which are hereby incorporated by reference.

BACKGROUND OF THE INVENTION

1. Field of the Invention

The present invention relates to image processing apparatus and method which improve a distribution of brightness of a digital image.

2. Related Background Art

Conventionally, as a method of taking a photograph of appropriate brightness, a method of measuring average luminance of a scene to be taken or photographed and then controlling shutter speed, an aperture value and the like based on the measured average luminance is known. Moreover, an exposure control method based on so-called evaluation photometry that a scene is first divided into predetermined areas, luminance of each of the divided areas is measured, the measured luminance is appropriately weighted with respect to each area, average luminance is then obtained based on the weighted values, and appropriate exposure is thus obtained with respect to the entire scene is known.

Incidentally, in a scene taken against light (also called a backlight scene) that the brightness of a main subject is remarkably dark as compared with that of its background, the main subject portion on a taken or photographed image is inevitably dark. Therefore, to take a photograph in which appropriate brightness can be secured even in case of a backlight scene, it is necessary at the moment of taking the photograph to preset exposure of a camera so that the subject is taken brightly as compared with a case of taking an average photograph. However, such an exposure correction operation is troublesome for a user, and moreover skill is required to appropriately set the exposure of the camera. Besides, in a digital image process to the image obtained by capturing the backlight scene, a process equivalent to the exposure correction operation can be performed. However, in any case, even if the exposure correction is appropriately performed with respect to the main subject, the background portion of the main subject adversely tends to become bright excessively.

In order to solve such a problem, it is necessary to obtain an image of appropriate brightness even in the backlight scene or the like that it is generally difficult to appropriately determine the brightness of the image.

Thus, to achieve this, in analog photographing technique, print of appropriate brightness can be obtained by performing so-called a dodging process in a darkroom. Therefore, it is desirable even in a digital image process to easily achieve a dodging process similar to that in the analog photographing technique.

For example, a method of achieving the dodging process is proposed by Daniel J. Jobson et al. in "A Multiscale Retinex for Bridging the Gap Between Color Images and the Human Observation of Scenes", IEEE TRANSACTIONS ON IMAGE PROCESSING, VOL. 6, NO. 7, JULY 1997 (hereinafter called prior art 1). In this method, a difference process between a component obtained by logarithmic transforming a digital image and a low-frequency component of the logarithmic-transformed component is performed to darken a bright component and brighten a dark component in a low-frequency area in the digital image, thereby achieving image improvement.

Besides, other methods of achieving the dodging process in the digital image process are proposed by Reinhard et al. in "Photographic Tone Reproduction for Digital Images", acm Transactions on Graphics, JULY 2002, Vol. 21, No. 3 (hereinafter called prior art 2), and Moroney "Local Color Correction Using Non-Linear Masking", IS&T/SID Eighth Color Imaging Conference (hereinafter called prior art 3). In each of these methods, a dodging-like effect is obtained in the digital image process by using a luminance component of a digital image and a low-frequency component thereof.

However, in such conventional methods, a degree of improvement in a case where large improvement is necessary with respect to the brightness of the main subject in the digital image to be processed is the same as that in a case where a little improvement is necessary with respect to the brightness of the main subject. Therefore, there is a problem that it is impossible to perform suitable improvement of the luminance distribution for the image data to be processed. This originates mainly in a fact that a purpose concerning how it is necessary to improve the luminance distribution in the image data to be processed is not clear.

Moreover, conventionally, when the conventional dodging method is applied to a case where the scene obtained by photographing and capturing the digital image to be processed is not the backlight scene, there is a problem that, although an effect of the correction is inferior, a processing time is long and costs for a memory or the like used in the process are unnecessarily high as compared with the case where the exposure correction is normally performed by the digital image process. In addition, even in the backlight scene, the necessity of brightness correction is not high with respect to an image other than the image in which particularly a person's face has been recorded darkly due to backlight.

SUMMARY OF THE INVENTION

An object of the present invention is to solve the above conventional problems, and furthermore to automatically adjust a degree of improvement of a brightness distribution with respect to image data particularly obtained by photographing a person in a backlight state, thereby enabling to improve the brightness distribution according to the image data to be processed.

Another object of the present invention is to solve the above conventional problems, and furthermore to automatically adjust a degree of improvement of a luminance distribution particularly with respect to a backlight scene, i.e., image data obtained by photographing a person's face in a backlight state, thereby enabling to optimally improve a brightness distribution according to the image data to be processed and also enabling to perform a process at relatively low costs with respect to image data obtained by capturing a scene, other than the backlight scene, for which the process effect is predicted to be inferior.

In order to achieve the above objects, the present invention is characterized by an image processing apparatus comprising: a brightness component extraction means for extracting a brightness component from image data; a scale conversion means for obtaining a distribution of the brightness component on relatively large scale; a brightness component improvement means for improving the distribution of the brightness component of the image data by using the brightness component and an output of the scale conversion means; and an image reproduction means for reproducing the image data by using an output of the brightness component improvement means as a distribution of a brightness component of a new image, wherein the image processing apparatus further comprises a face detection means for detecting a face area from the image data, and the brightness component improvement means adjusts a degree of improvement by using a distribution of a brightness component of the face area being an output of the face detection means.

Further, the present invention is characterized by an image processing method comprising: an extraction step of extracting a low-frequency brightness component from image data of an input image; a detection step of detecting a face area in the input image; a setting step of setting a parameter according to a distribution of a brightness component of the face area; and a correction step of correcting a brightness component of the image data by using the low-frequency brightness component and the parameter.

Moreover, the present invention is characterized by a program for achieving, by a computer, an image processing method comprising: an extraction step of extracting a low-frequency brightness component from image data of an input image; a detection step of detecting a face area in the input image; a setting step of setting a parameter according to a distribution of a brightness component of the face area; and a correction step of correcting a brightness component of the image data by using the low-frequency brightness component and the parameter.

Furthermore, the present invention is characterized by an image processing method comprising: a first brightness component improvement step of improving a brightness component distribution of an input image by using a distribution of a brightness component of the input image on a predetermined scale; a detection step of detecting a predetermined image area by analyzing the image processed in the first brightness component improvement step; a second brightness component improvement step of improving the brightness component distribution of the input image by using a brightness component value of the predetermined image area detected in the detection step; and an output step of outputting the image processed in the second brightness component improvement step.

Furthermore, the present invention is characterized by a program for achieving, by a computer, an image processing method comprising: a first brightness component improvement step of improving a brightness component distribution of an input image by using a distribution of a brightness component of the input image on a predetermined scale; a detection step of detecting a predetermined image area by analyzing the image processed in the first brightness component improvement step; a second brightness component improvement step of improving the brightness component distribution of the input image by using a brightness component value of the predetermined image area detected in the detection step; and an output step of outputting the image processed in the second brightness component improvement step.

Furthermore, the present invention is characterized by an image processing apparatus comprising: a luminance extraction means for extracting a luminance component from image data; a scale conversion means for obtaining a distribution of the luminance component on relatively large scale; a luminance improvement means for improving a luminance distribution of the image data; and an image reproduction means for reproducing the image data by using an output of the luminance improvement means as a luminance distribution of a new image, wherein a process effect of the luminance improvement means in which an output of the scale conversion means is used is predicted, when it is predicted that the process effect is high, the luminance improvement means improves the luminance distribution of the image data by using the output of the scale conversion means, and, when it is predicted that the process effect is low, the luminance improvement means improves the luminance distribution of the image data without using the output of the scale conversion means.

Furthermore, the present invention is characterized by an image processing method comprising: a luminance extraction step of extracting a luminance component from image data; a scale conversion step of obtaining a distribution of the luminance component on relatively large scale; a luminance improvement step of improving a luminance distribution of the image data; and an image reproduction step of reproducing the image data by using an output in the luminance improvement step as a luminance distribution of a new image, wherein a process effect in the luminance improvement step in which an output in the scale conversion step is used is predicted, when it is predicted that the process effect is high, the luminance improvement step improves the luminance distribution of the image data by using the output in the scale conversion step, and, when it is predicted that the process effect is low, the luminance improvement step improves the luminance distribution of the image data without using the output in the scale conversion step.

Furthermore, the present invention is characterized by a program for achieving, by a computer, an image processing method comprising: a luminance extraction step of extracting a luminance component from image data; a scale conversion step of obtaining a distribution of the luminance component on relatively large scale; a luminance improvement step of improving a luminance distribution of the image data; and an image reproduction step of reproducing the image data by using an output in the luminance improvement step as a luminance distribution of a new image, wherein a process effect in the luminance improvement step in which an output in the scale conversion step is used is predicted, when it is predicted that the process effect is high, the luminance improvement step improves the luminance distribution of the image data by using the output in the scale conversion step, and, when it is predicted that the process effect is low, the luminance improvement step improves the luminance distribution of the image data without using the output in the scale conversion step.

Other object and features of the present invention will be apparent from the following description in conjunction with the accompanying drawings.

DETAILED DESCRIPTION OF THE PREFERRED EMBODIMENTS

First Embodiment

Figure 1:
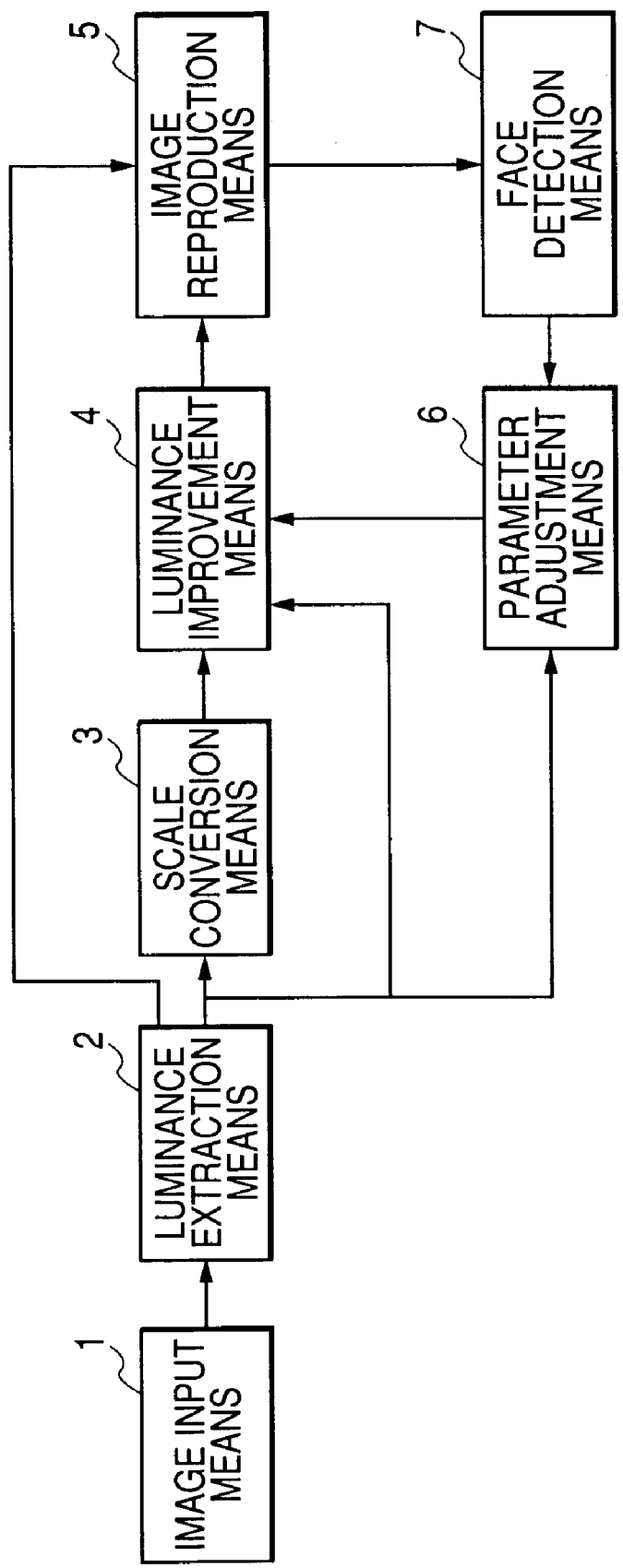
FIG. 1 is a block diagram showing the structure of an image processing system according to the first embodiment of the present invention.

FIG. 1 is a block diagram showing the structure of an image processing system according to the first embodiment of the present invention.

In FIG. 1, reference numeral 1 denotes an image input means for inputting digital image data (hereinafter, called image data) into the image processing system. For example, the input means is constituted by a digital camera, a scanner or the like.

Reference numeral 2 denotes a luminance extraction means for extracting a luminance component and a color component from the image data input by the image input means 1.

Reference numeral 3 denotes a scale conversion means for obtaining a distribution, on relatively large scale, of the luminance components of the image data output from the luminance extraction means 2.

Reference numeral 4 denotes a luminance improvement means for improving a distribution of the luminance components of the image data by use of the luminance component of the image data output from the luminance extraction means 2 and the distribution, on relatively large scale, of the luminance components output from the scale conversion means 3.

Reference numeral 5 denotes an image reproduction means for reconstituting the image data by synthesizing the improved luminance component output from the luminance improvement means 4 and the color component output from the luminance extraction means 2 together.

Reference numeral 6 denotes a parameter adjustment means for adjusting parameters so as to optimize, according to the image data, a degree of improvement to be processed in the luminance improvement means 4 on the basis of the luminance component of the image data output from the luminance extraction means 2.

Reference numeral 7 denotes a face detection means for detecting, as a face area, a portion corresponding to a person's face from the image data output from the image reproduction means 5.

The above image processing system can be operated by an application program functioning on a general-purpose computer. Hereinafter, in the present embodiment, the image processing system which is operated mainly by the application program will be explained.

Figure 2:
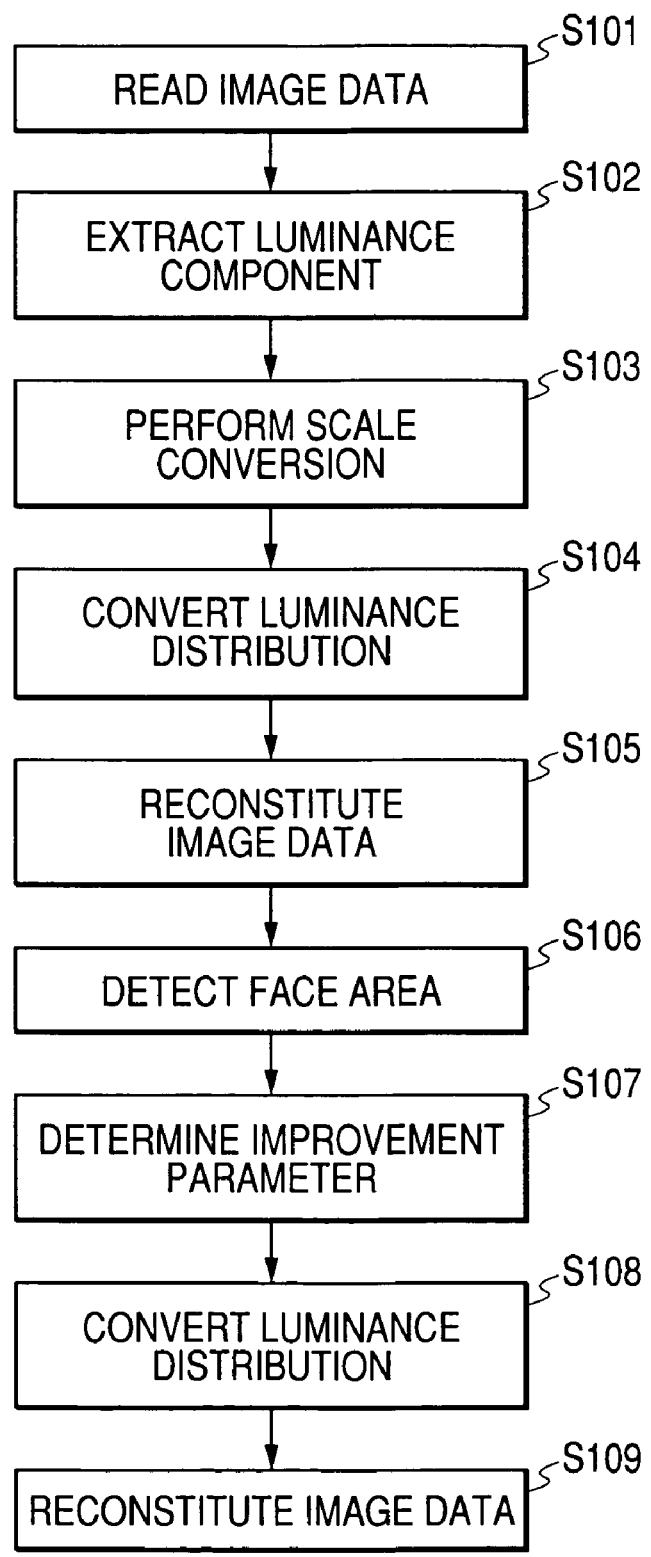
FIG. 2 is a flow chart showing an algorithm of an application program in the image processing system.

FIG. 2 shows an algorithm of the application program by which the image processing system according to the present embodiment is operated on the general-purpose computer.

First, when the application program is activated, a user inputs a file name of the image data, and the image data and the photographing data are read and stored in a storage unit of the computer (step S101).

Here, the read image data corresponds to a two-dimensional arrangement of M×N pixels (here, M is the number of horizontal pixels and N is the number of vertical pixels) composed of, e.g., eight-bit pixels, and the image data is composed of three planes of R, G and B components. The image data is assumed to be expressed by the R, G and B components as R(x, y), G(x, y) and B(x, y) (here, (x, y) are integers representing a pixel position; $1 \leq x \leq M$, and $1 \leq y \leq N$). In a case where the image data is compressed by a JPEG (Joint Photographic Experts Group) method or the like, the image data is expanded in accordance with a predetermined expansion (or extraction) method, and the image data composed of the pixels of the R, G and B components is obtained.

Next, the luminance component is extracted on the basis of each pixel of the R, G and B components composing the image data (step S102).

With respect to extraction of the luminance component, for example, it is assumed that the pixel components of R, G and B correspond to data in an sRGB color space described in IEC (International Electro-technical Commission) 61966-2-1, and the data is converted into data of CIE (Commission Internationale de l'Eclairage) 1931 XYZ by gamma conversion and a 3×3 matrix operation in accordance with a method described in the IEC 61966-2-1. Here, when the converted data of XYZ are respectively assumed as X(x, y), Y(x, y) and Z(x, y), data of Y(x, y) corresponds to the luminance component to be extracted. When the luminance extraction is achieved by hardware, for example, it can be achieved by a table reference circuit (section of gamma conversion) according to a look-up table and a matrix operation circuit.

As a method of extracting the luminance component, the above process may be simplified, that is, the luminance component may be extracted only by the matrix operation. Further, conversion from RGB into YCbCr, RGB into L*a*b*, or RGB into HSV may be used.

Next, the distribution of the luminance component on relatively large scale is obtained from the extracted luminance component (step S103).

In order to obtain the distribution of the luminance component on relatively large scale (distribution of the low frequency luminance component), for example, as shown in the prior art 1, a convolution operation is performed with respect to the extracted luminance component and a Gaussian function to supply an output. However, in the prior art 1, the convolution operation is performed with respect to each pixel of the R, G and B components of the improved image data instead of the luminance component of the image data. Here, to raise image quality of the improved image data, it is preferable that the convolution operation with the plural Gaussian functions different in the standard deviation is performed to obtain the distribution of the luminance component on plural scales. It should be noted that the above process of obtaining the distribution of the luminance component on large scale is called scale conversion hereinafter. In case of achieving the scale conversion by hardware, e.g., a convolution operation circuit.

Next, the distribution of the luminance component of the image data is improved using the luminance component of the image data and the distribution of the luminance component to which the scale conversion was performed (step S104).

As an example of a process, according to a method based on the prior art 1, logarithmic transformation is performed for the luminance component and the distribution of the luminance component to which the scale conversion was performed, and the obtained difference between them is output. Further, a weighted average of difference outputs on different scales is assumed as the improved luminance component. However, since the degree of improvement cannot be adjusted according to an image by this method, a logarithmic transformation output of the luminance component, to which the scale conversion was performed, is multiplied by a coefficient. This coefficient corresponds to a parameter of adjusting the degree of improvement. An output of the luminance component which was improved based on the above-explained process is indicated by the following equation (1).

$$Y'(x, y) = \sum_n w_n \{\log Y(x, y) - \gamma \cdot \log[F_n(x, y) * Y(x, y)]\} \quad (1)$$

Here, Y'(x, y), $F_n$ (x, y), $w_n$, n and γ are respectively an output of the improved luminance component, a Gaussian function, weight between scales, a parameter representing the scale and a parameter representing the degree of improvement. Further, a symbol "*" denotes the convolution operation.

It has been known that the weight between scales can be omitted by adjusting a standard deviation of the scale (replaced to a simple average) and it is preferable to return a luminance unit to an original luminance unit by an inverse transformation (exp. operation) rather than a value logarithmic-transformed is output as in the equation (1) as image quality of the improved image data. Therefore, it is preferable that an output represented by the following equation (2) corresponds to the improved luminance component.

$$Y'(x,y) = \exp < \log Y(x,y) - \gamma \cdot \text{Avg}\{\log[F_n(x,y) * Y(x,y)]\} > \quad (2)$$

Here, the Avg indicates an average value operation. The following equation (3) may be available instead of the equation (2).

$$Y'(x, y) = \frac{Y(x, y)}{[Avg\{F_n(x, y) * Y(x, y)\}]^\gamma} \quad (3)$$

Incidentally, the luminance improvement process in the step S104 is a preprocess which extracts a face area with a high degree of accuracy in a step S106, whereby the intensified luminance improvement process is performed here. In the present embodiment, a predetermined value γ=1 is used.

It should be noted that the average value operation of a scale conversion output on the plural scales is performed by the scale conversion process in the step S103, and an average value of the scale conversion output on the plural scales may be the distribution of the luminance component to which the scale conversion was performed.

In case of achieving this luminance conversion by the hardware, for example, it can be achieved by an average value operation circuit, a circuit for forming the look-up table, a table storage unit, the table reference circuit (section of gamma conversion) and a division circuit. The average value operation circuit may be provided in the scale conversion means.

Next, the improved luminance component and the color components X(x, y) and Z(x, y) converted in the step S102 are synthesized to reconstitute the image data (step S105).

Here, initially, the color component is corrected in accordance with the change of the luminance component so that color of the reconstituted image data is not changed as much as possible. For example, the color components X(x, y) and Z(x, y) are respectively multiplied by a ratio between before and after changing the luminance component Y'(x, y)/Y(x, y). Then, the RGB data is obtained from X, Y and Z data. A process executed here corresponds to inverse conversion of the process in the step S102. Therefore, the 3×3 matrix operation and an inverse gamma conversion process are executed to output data of eight-bit for each of the R, G and B components. In case of achieving the reconstitution of the image data by hardware, for example, a multiplication/division circuit, the matrix operation circuit, and the table reference circuit (section of inverse gamma conversion) depending on the look-up table can be used.

In case of using another method such as a conversion from the RGB into the YCbCr in the step S102 as a method of extracting the luminance component, it is needless to say that a corresponding inverse conversion process has to be executed in this process.

Next, the location corresponding to a person's face is detected as the face area from the image data in which the luminance distribution has been improved (step S106).

Figure 3A:
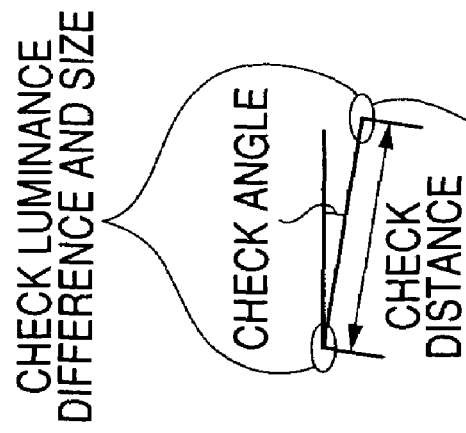
FIGS. 3A, 3B and 3C are diagrams for respectively explaining process contents in face detection according to the first embodiment.
Figure 3B:
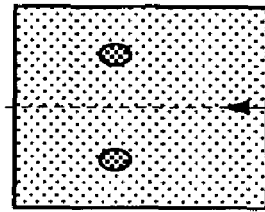
Figure 3C:
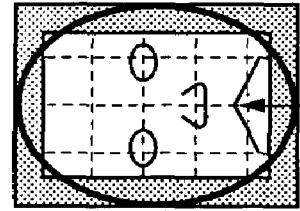

An example of process content for detecting the face area from the image data is shown in FIGS. 3A to 3C. First, the image data is subjected to a low-pass filtering process of predetermined image size and is simultaneously reduced. Then, areas where the R, G and B components are locally small are extracted as candidates of the image areas of eyes on the basis of the pixel value of the reduced image data, and candidates sets each consisting of the extracted two candidates are made. Next, on the basis of equivalency of sizes, a difference in luminance, angles from the horizontal and the like between the two areas in each candidate set, it is judged whether or not the two areas in the candidate set represent eyes (FIG. 3A). Subsequently, with respect to the candidate set judged as eyes, a rectangular area is set from such two locations based on preset parameters concerning predetermined location relations (FIG. 3B), and the rectangular area is decided based on the edge in the vicinity of the border of the rectangular area and color information within this area (FIG. 3C). More specifically, with respect to the edge, it is judged whether or not edge components exceeding predetermined intensity occupies at a predetermined ratio or more in a predetermined width area in the vicinity of the border. Besides, with respect to the color information, an average value of the pixel values within the rectangular area is calculated, and it is then judged whether or not the calculated average value is in a preset skin color area. When both the edge and the color information satisfy respective conditions, the area in question is judged as the face area, and the position information of the rectangular area judged as the face area is output as the face area.

In the present invention, the method of detecting the face area from the image data is not limited to the above. That is, for example, a method proposed by Yang et al. in "Detecting Faces In Images: A Survey", IEEE TRANSACTIONS ON PATERN ANALYSIS AND MACHINE INTELLIGENCE, VOL. 24, NO. 1, JANUARY 2002 may be applied.

Next, a parameter for determining a degree of a luminance distribution to be improved is adjusted from the luminance component extracted in the step S102 and the face area detected in the step S106 (step S107).

Hereinafter, an example of a parameter adjusting method will be explained as to a case of performing the luminance conversion by the equation (3) in the step S104.

First, in the luminance component of the image data, an average value of the luminance values within the face area is calculated. Here, it should be noted that matters such as eyes, hairs and the like which are not skin either exist within the rectangular area detected as the face area. Therefore, the average value of only the luminance values of predetermined percentage or more from the highest luminance value is calculated with respect to the pixels within the face area, and the calculated average value is assumed as a representative value of the luminance of the portion corresponding to the skin (hereinafter, called a human skin representative luminance value). On one hand, a predetermined value (hereinafter, called a human skin target luminance value) is preset as a desirable value of the luminance value of the human skin in the image to be improved, a weighted average of the human skin representative luminance value and the human skin target luminance value is obtained based on predetermined weight, and the obtained average value is set as a target luminance value. Here, when it is assumed that the human skin representative luminance value is $Y_0$ and the target luminance value after the weighted average is obtained is $Y_1$, a parameter $\gamma$, by which the luminance value $Y_0$ reaches a predetermined luminance value ($Y_0 \leq Y_1$), is assumed as a parameter representing the degree of improvement. Supposing that an operating result within [ ] described in the denominator of the equation (3) is nearly equal to Y(x, y), the parameter $\gamma$ can be obtained by the following equation (4).

$$\gamma = 1 - \frac{\log Y_1}{\log Y_0} \quad (4)$$

Then, in a manner similar to that in the step S104, the distribution of the luminance component of the image data is improved using the luminance component of the image data, the distribution of the scale-converted luminance component, and the obtained parameter $\gamma$ (step S108).

Subsequently, in a manner similar to that in the step S105, the improved luminance component and the color components X(x, y) and Z(x, y) converted in the step S102 are synthesized to reconstitute the image data (step S109).

In the foregoing example, the method of improving the distribution of brightness in the optimum condition according to the image data to be processed based on the prior art 1 is explained. In the following, a method of improving the distribution of brightness in the optimum condition according to the image data to be processed based on the prior art 2 will be explained. Here, it should be noted that, since a difference between the above operation and the following operation is mainly directed to the process of improving the distribution of the luminance component of the image data to be executed in the step S105, this part different from the above example will be mainly explained.

According to the prior art 2, the degree of generating a halo after performing the luminance conversion by using the luminance components on different scales is evaluated, and the most suitable scale is determined so that deterioration in image quality due to generation of the halo does not occur and then the luminance conversion is to be performed. A case of applying the present invention to the process will be indicated in the following equation (5).

$$Y'(x, y) = \frac{a \cdot Y(x, y)}{1 + e \cdot V(x, y)} \quad (5)$$

Here, the V(x, y) denotes a luminance component selected from the luminance components to which the plural scale conversions were performed, symbol a denotes a parameter of adjusting intensity of the luminance component, and symbol e denotes a parameter of indicating the degree of improvement of the luminance component. Incidentally, it is needless to say that an adjustment method of an improvement parameter in the step S107 has to be changed in accordance with the change of an adjustment method in the luminance component improvement process.

In the example explained based on the prior art 2, although the luminance component itself of the image is to be adjusted together with the degree of improvement of the luminance component, it is needless to say that the present invention may be combined with a process of adjusting the luminance component itself of the image.

In the process of the steps S104 and S108, as a value within [ ] described in the denominator of the equation (3), a bilateral filtering process proposed by Durand et al. in "Fast Bilateral Filtering for the Display of High-Dynamic-Range Images", acm Transactions on Graphics, JULY 2002, Vol. 21, No. 3 may be applied to the luminance component. In that case, the bilateral filtering process is previously executed to the luminance component in the scale conversion process in the step S103.

Incidentally, because the process through the steps S104 to S106 is the preprocess for obtaining the parameter value in the step S107, it is possible to perform the process in the steps S104 to S106 to the image data previously reduced in size with respect to the original image data, determine the parameter value in the step S107, and then perform the process in and after the step S108. By doing so, it is possible to shorten a processing time even when the size of the original image data is remarkably large.

Besides, in the present embodiment, the eight-bit R, G and B data are assumed as the image data to be processed. However, the present invention is also applicable to a case where optimum eight-bit R, G and B image data are reproduced from 16-bit R, G and B image data.

According to the present embodiment, particularly, with respect to the image data obtained by photographing a person in a backlight state, it is possible to automatically adjust the degree of improvement of the luminance distribution and also optimally improve the distribution of brightness according to the image data to be processed.

Second Embodiment

Figure 4:
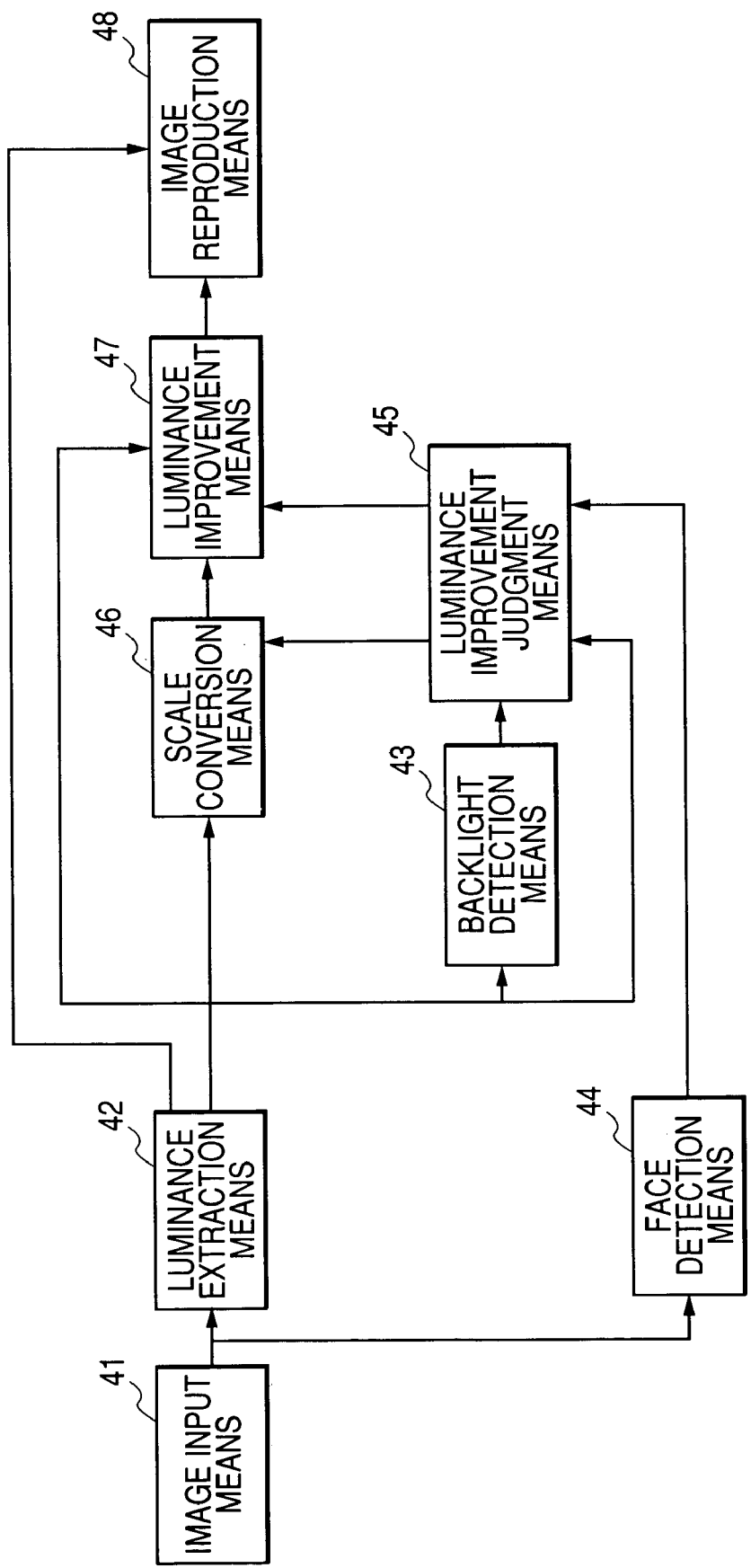
FIG. 4 is a block diagram showing the structure of an image processing system according to the second embodiment of the present invention.

FIG. 4 is a block diagram showing the structure of an image processing system according to the second embodiment of the present invention.

In FIG. 4, reference numeral 41 denotes an image input means for inputting digital image data (hereinafter, called image data) into the image processing system. For example, the input means 41 is constituted by a digital camera, a scanner, or the like. Reference numeral 42 denotes a luminance extraction means for extracting a luminance component and a color component from the image data input by the image input means 41. Reference numeral 43 denotes a backlight detection means for obtaining a degree of backlight of the image data input by the image input means 41 from the luminance component of the image data output from the luminance extraction means 42. Reference numeral 44 denotes a face detection means for detecting, as a face area, a portion corresponding to a person's face from the image data input by the image input means 41. Reference numeral 45 denotes a luminance improvement judgment means for selecting an luminance improvement process method from the degree of the backlight output from the backlight detection means 43 and the detection result of the face detection means 44, and adjusting, according to the image data, a parameter so as to optimize the degree of improvement processed by a luminance improvement means 47 from the luminance component of the image data output from the luminance extraction means 42. Reference numeral 46 denotes a scale conversion means for obtaining a distribution, on relatively large scale, of the luminance components of the image data output from the luminance extraction means 42. Reference numeral 47 denotes the luminance improvement means for improving a distribution of the luminance components of the image data by use of the luminance component of the image data output from the luminance extraction means 42 and the distribution, on relatively large scale, of the luminance components output from the scale conversion means 43. Reference numeral 48 denotes an image reproduction means for reconstituting the image data by synthesizing the improved luminance component output from the luminance improvement means 47 and the color component output from the luminance extraction means 42 together.

The above image processing system can be operated by an application program functioning on a general-purpose computer. Hereinafter, in the present embodiment, the image processing system which is operated mainly by the application program will be explained.

Figure 5:
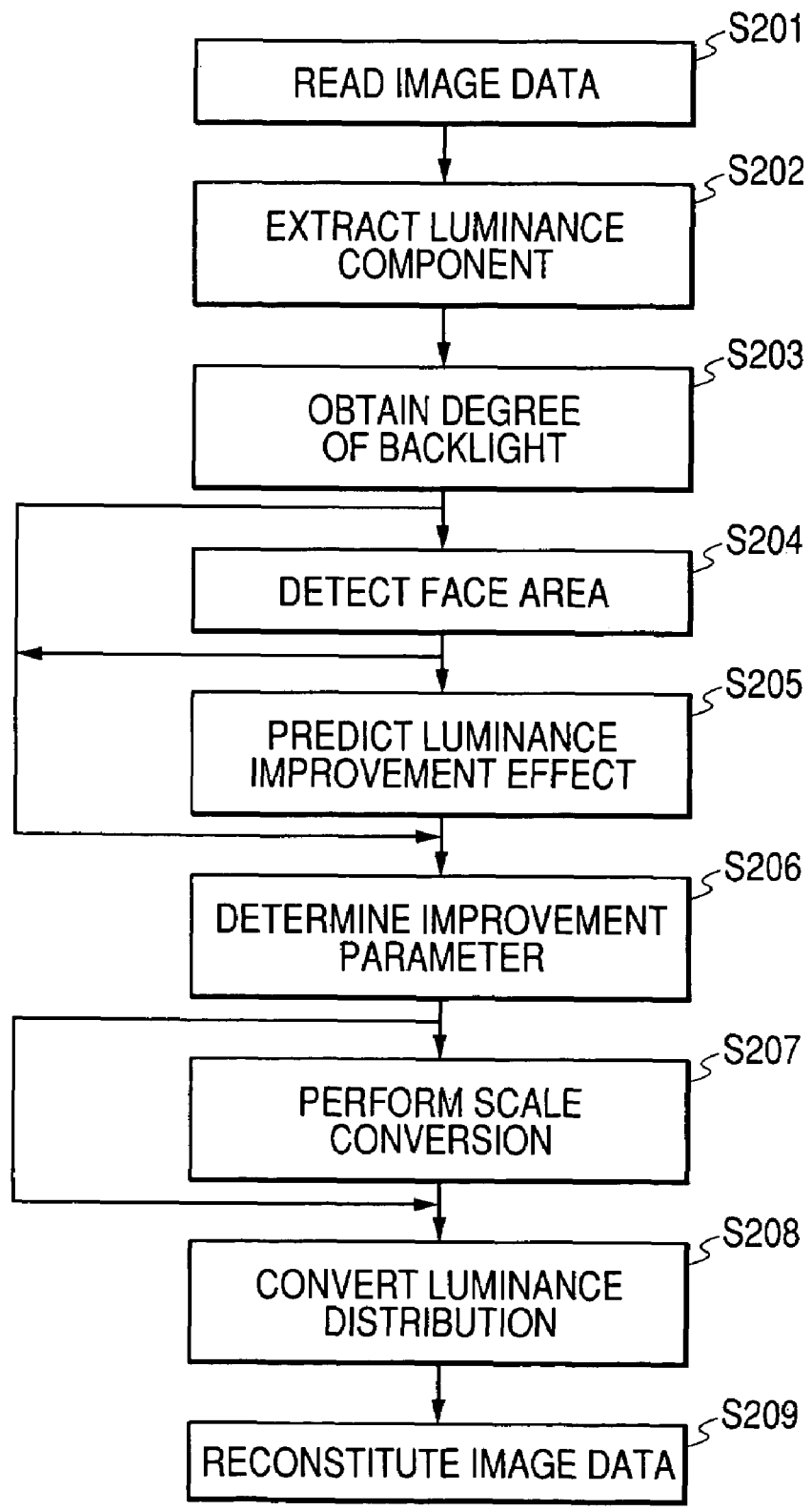
FIG. 5 is a flow chart showing an algorithm of an application program in the image processing system.

FIG. 5 shows an algorithm of the application program by which the image processing system according to the present embodiment is operated on the general-purpose computer.

First, when the application program is activated, a user inputs a file name of the image data, and the image data is read and stored in a storage unit of the computer by the image data input means 41 (step S201).

Here, the read image data corresponds to a two-dimensional arrangement of M×N pixels (here, M is the number of horizontal pixels and N is the number of vertical pixels) composed of, e.g., eight-bit pixels, and the image data is composed of three planes of R (red), G (green) and B (blue) components. The image data is assumed to be expressed by the R, G and B components as R(x, y), G(x, y) and B(x, y) (here, (x, y) are integers representing a pixel position; $1 \leq x \leq M$, and $1 \leq y \leq N$). In a case where the image data is compressed by a JPEG method or the like, the image data is expanded according to a predetermined expansion (or extraction) method, and the image data composed of the R, G and B component pixels is obtained.

Next, the luminance component is extracted based on each pixel of the R, G and B components constituting the image data by the luminance extraction means 42 (step S202).

With respect to extraction of the luminance component, for example, it is assumed that the R, G and B pixel components correspond to data in an sRGB color space described in IEC 61966-2-1, and the data is converted into data of CIE 1931 XYZ by gamma conversion and a 3×3 matrix operation according to a method described in the IEC 61966-2-1. Here, when the converted X, Y and Z data are respectively assumed as X(x, y), Y(x, y) and Z(x, y), the Y(x, y) data corresponds to the luminance component to be extracted.

As a method of extracting the luminance component, the above process may be simplified, that is, the luminance component may be extracted only by the matrix operation. Further, conversion from RGB into YCbCr, RGB into L*a*b*, or RGB into HSV may be used.

Hereinafter, an outline of the process in and after a step S203 will be first explained, and then the process in each step will be explained in detail.

First, the backlight detection means 43 obtains a degree of backlight in the image data input in the step S201, based on the luminance component extracted in the step S202 (step S203).

Here, when the obtained degree of backlight is low, the luminance improvement judgment means 45 predicts that the effect in the process of the luminance improvement means 47 in which the distribution, on relatively large scale, of the luminance component of the image data being the output of the scale conversion means 46 is used is low, and the flow advances to a step S206.

Next, the face detection means 44 extracts a person's face area from the image data input in the step S201 (step S204).

Here, when the face area of which the size is equal to or larger than a predetermined size is not detected, the luminance improvement judgment means 45 predicts that the effect in the process of the luminance improvement means 47 in which the distribution, on relatively large scale, of the luminance component of the image data being the output of the scale conversion means 46 is used is low, and the flow advances to the step S206.

Then, the luminance improvement judgment means 45 obtains a luminance representative value of the face area and a luminance representative value of the entire image, and predicts the effect in the process of the luminance improvement means 47 in which the distribution, on relatively large scale, of the luminance component of the image data being the output of the scale conversion means 46 is used, on the basis of the luminance representative value of the entire image and the luminance representative value of the face area (step S205).

Next, the luminance improvement judgment means 45 determines a parameter for determining a degree of the luminance distribution to be improved, according to the predicted result of the process effect (step S206).

Here, when it is predicted that the effect in the process of the luminance improvement means 47 in which the distribution, on relatively large scale, of the luminance component of the image data being the output of the scale conversion means 46 is used is low, and the flow advances to the step S208.

Next, the scale conversion means 46 obtains the distribution of the luminance component on relatively large scale from the luminance component extracted in the step S202 (step S207).

Then, the luminance improvement means 47 improves the distribution of the luminance component of the image data by using the parameter obtained in the step S206, in accordance with the predicted result of the process effect (step S208).

Subsequently, the image reproduction means 48 synthesizes the improved luminance component and the color component converted in the step S202 together, and thus reconstitutes the image data (step S209).

Hereinafter, the process in each of the steps S203 to S209 will be explained in detail.

In the step S203, the degree of backlight of the image data input in the step S201 is obtained based on the extracted luminance component.

First, a luminance histogram which represents a frequency of the luminance component with respect to each luminance range is formed based on the luminance component of the image data. Here, it is assumed that symbol P1 denotes a frequency of ranges YT1 to YT2 of the predetermined luminance value corresponding to an intermediate portion of the luminance range and symbol P2 denotes a frequency of a range YT2 to YTmax of the luminance value brighter than the intermediate portion, a degree of backlight (PB) is obtained by the following equation (6).

$$PB = P2 - kB \cdot P1 \quad (6)$$

where 0<YT1<YT2<YTmax is satisfied, symbol YTmax denotes the maximum value of the luminance range, and symbol kB denotes a constant.

Here, it should be noted that the equation (6) is based on the assumption that, in a backlight scene, backlight occurs because the area of the brighter portion is large in the image.

When the obtained degree of backlight is lower than a predetermined value, the luminance improvement judgment means 45 predicts that the effect in the process of the luminance improvement means 47 in which the distribution, on relatively large scale, of the luminance component of the image data being the output of the scale conversion means 46 is used is low.

Incidentally, the method of obtaining the degree of backlight is not limited to the above. That is, as proposed in Japanese Patent Application Laid-Open No. 2000-134467 by the assignee of the present application, it is possible to use, as the degree of backlight, the number of peak areas obtained from a luminance histogram. In that case, for example, if there are the plural peak numbers, the luminance improvement judgment means 45 predicts that the effect in the process of the luminance improvement means 47 in which the distribution, on relatively large scale, of the luminance component of the image data being the output of the scale conversion means 46 is used is low. Incidentally, it is needless to say that the degree of backlight may be determined by appropriately incorporating the number of peak areas into the equation (6).

In the step S204, the person's face area is detected from the image data input in the step S201.

An example of process content for detecting the face area from the image data is shown in FIGS. 3A to 3C. First, the image data is subjected to a low-pass filtering process of predetermined image size and is simultaneously reduced. Then, areas where the R, G and B components are locally small are extracted as candidates of the image areas of eyes on the basis of the pixel value of the reduced image data, and candidates sets each consisting of the extracted two candidates are made. Next, on the basis of equivalency of sizes, a difference in luminance, angles from the horizontal and the like between the two areas in each candidate set, it is judged whether or not the two areas in the candidate set represent eyes (FIG. 3A). Subsequently, with respect to the candidate set judged as eyes, a rectangular area is set from such two locations based on preset parameters concerning predetermined location relations (FIG. 3B), and the rectangular area is decided based on the edge in the vicinity of the border of the rectangular area and color information within this area (FIG. 3C). More specifically, with respect to the edge, it is judged whether or not edge components exceeding predetermined intensity occupies at a predetermined ratio or more in a predetermined width area in the vicinity of the border. Besides, with respect to the color information, an average value of the pixel values within the rectangular area is calculated, and it is then judged whether or not the calculated average value is in a preset skin color area. When both the edge and the color information satisfy respective conditions, the area in question is judged as the face area, and the position information of the rectangular area judged as the face area is output as the face area.

Here, when the face area of which the size is equal to or larger than a predetermined size is not detected, the luminance improvement judgment means 45 predicts that the effect in the process of the luminance improvement means 47 in which the distribution, on relatively large scale, of the luminance component of the image data being the output of the scale conversion means 46 is used is low.

In the present invention, the method of detecting the face area from the image data is not limited to the above. That is, for example, the method proposed by Yang et al. in "Detecting Faces In Images: A Survey", IEEE TRANSACTIONS ON PATERN ANALYSIS AND MACHINE INTELLIGENCE, VOL. 24, NO. 1, JANUARY 2002 may be applied.

Subsequently, the process in each of the steps S207 and S208 will be explained, and thereafter the process in each of the steps S205 and S206 will be explained.

In the step S207, the distribution of the luminance component (i.e., the low-frequency component of the luminance component), on relatively large scale, is obtained from the luminance component extracted in the step S202.

To obtain the distribution of the luminance component on relatively large scale, for example, as shown in the prior art 1, a convolution operation is performed with respect to the extracted luminance component and a Gaussian function to supply an output. However, in the prior art 1, the MAX operation is performed with respect to each pixel of the R, G and B components of the improved image data instead of the luminance component of the image data. Here, to raise image quality of the improved image data, it is preferable that the convolution operation with the plural Gaussian functions different in the standard deviation is performed to obtain the distribution of the luminance component on plural scales. It should be noted that the above process of obtaining the distribution of the luminance component on large scale is called scale conversion hereinafter.

In the step S208, the distribution of the luminance component of the image data is improved using the parameter obtained in the step S206, in accordance with the predicted result of the process effect.

First, a luminance improvement process to be performed when the luminance improvement judgment means 45 predicts that the effect in the process of the luminance improvement means 47 in which the distribution, on relatively large scale, of the luminance component of the image data being the output of the scale conversion means 46 is used is high will be explained.

As an example of a process, according to the method based on the prior art 1, logarithmic transformation is performed for the luminance component and the distribution of the luminance component to which the scale conversion was performed, and the obtained difference between them is output. Further, a weighted average of difference outputs on different scales is assumed as the improved luminance component. However, since the degree of improvement cannot be adjusted according to the image by this method, a logarithmic transformation output of the luminance component, to which the scale conversion was performed, is multiplied by a coefficient. This coefficient corresponds to the parameter of adjusting the degree of improvement. An output of the luminance component which was improved based on the above-explained process is indicated by the following equation (1).

$$Y'(x, y) = \sum_n w_n \{\log Y(x, y) - \gamma \cdot \log[F_n(x, y) * Y(x, y)]\} \quad (1)$$

Here, Y'(x, y), $F_n$ (x, y), $w_n$, n and γ are respectively an output of the improved luminance component, a Gaussian function, weight between scales, a parameter representing the scale and a parameter representing the degree of improvement. Further, a symbol "*" denotes the convolution operation.

It has been known that the weight between scales can be omitted by adjusting a standard deviation of the scale (replaced to a simple average) and it is preferable to return a luminance unit to an original luminance unit by an inverse transformation (exp. operation) rather than a value logarithmic-transformed is output as in the equation (1) as image quality of the improved image data. Therefore, it is preferable that an output represented by the following equation (2) corresponds to the improved luminance component.

$$Y'(x,y)=\exp<\log Y(x,y)-\gamma \cdot \text{Avg}\{\log[F_n(x,y)*Y(x,y)]\}> \quad (2)$$

Here, the Avg indicates an average value operation.

Incidentally, the following equation (3) may be available instead of the equation (2).

$$Y'(x,y) = \frac{Y(x,y)}{[Avg\{F_n(x,y)*Y(x,y)\}]^\gamma} \quad (3)$$

More preferably, in the present embodiment, the luminance distribution is converted through the process of the following equation (7) instead of the equation (3).

$$Y'(x,y) = \frac{Y(x,y)^{\gamma 0}}{[Avg\{F_n(x,y)*Y(x,y)\}]^\gamma} \quad (7)$$

where, γ0 is a parameter for adjusting the luminance component of the entire image.

Besides, it is possible to calculate the average value of the scale conversion outputs on plural scales in the scale conversion process of the step S207, and set the obtained average value as the distribution of the scale-converted luminance component.

Next, the luminance improvement process to be performed when the luminance improvement judgment means 45 predicts that the effect in the process of the luminance improvement means 47 in which the distribution, on relatively large scale, of the luminance component of the image data being the output of the scale conversion means 46 is used is low will be explained. In that case, it is predicted that the improvement equivalent to the result of the above luminance improvement process can be achieved even if ordinary exposure correction is performed in the digital image process. More specifically, γ=0 is set in the equation (7), and the luminance conversion is performed according to the following equation (8).

$$Y'(x,y)=Y(x,y)^{\gamma 0} \quad (8)$$

As compared with the equation (7), it is unnecessary in the equation (8) to obtain the distribution on relatively large scale in the scale conversion process. Moreover, in the equation (8), the operation of the dominator and the division both to be performed in the equation (7) are unnecessary.

Then, the processes of the steps S205 and S206 to determine the parameter in the luminance improvement process will be explained in detail.

In the step S205, the luminance representative value of the face area and the luminance representative value of the entire image are obtained. Then, based on the luminance representative value of the entire image and the luminance representative value of the face area, the luminance improvement judgment means 45 predicts the effect in the process of the luminance improvement means 47 in which the distribution, on relatively large scale, of the luminance component of the image data being the output of the scale conversion means 46 is used.

More specifically, as the luminance representative value of the entire image, the average value of the luminance values is calculated and set as $Y_A$. On one hand, a luminance value $Y_{AT}$ being the target of the image to be improved with respect to a luminance representative value $Y_A$ of the entire image is previously stored as a table, and the luminance value $Y_{AT}$ being the target of the image to be improved with respect to the obtained luminance representative value $Y_A$ of the entire image is obtained by referring to the table. Then, the luminance of the entire image based on, e.g., the equation (8) is corrected, whereby the parameter γ0 for obtaining the luminance value $Y_{AT}$ being the target of the luminance value $Y_A$ of the entire image can be obtained by the following equation (9).

$$\gamma 0 = \log Y_A / \log Y_{AT} \quad (9)$$

Further, in the luminance component of the image data, the average value of the luminance values within the face area is calculated and set as $Y_f$. Here, it should be noted that matters such as eyes, hairs and the like which are not skin either exist within the rectangular area detected as the face area. Therefore, the average value of only the luminance values of predetermined percentage or more from the highest luminance value is calculated with respect to the pixels within the face area, and the calculated average value is assumed as a representative value of the luminance of the portion corresponding to the skin (hereinafter, called a human skin representative luminance value). On one hand, a predetermined value (hereinafter, called a human skin target luminance value) is preset as a desirable value of the luminance value of the human skin in the image to be improved, a weighted average of the human skin representative luminance value and the human skin target luminance value is obtained based on predetermined weight, and the obtained average value is set as a target luminance value. Here, when it is assumed that the human skin representative luminance value is $Y_f$ and the target luminance value after the weighted average is obtained is $Y_{fT}$, a parameter γ, by which the luminance value $Y_f$ reaches a predetermined luminance value, is assumed as a parameter representing the degree of improvement. In respect that the human skin representative luminance value $Y_f$ is corrected by the previously obtained parameter γ0, a human skin representative luminance value $Y'_f$ is obtained by the following equation (10).

$$Y'_f = Y_f^{\gamma 0} \quad (10)$$

Here, in case of $Y'_f < Y_{fT}$ (11), it is possible to predict that the effect in the process of the luminance improvement means 47 in which the distribution, on relatively large scale, of the luminance component of the image data being the output of the scale conversion means 46 is used is high. Therefore, in case of the inequality (11), the luminance improvement judgment means 45 predicts that the effect in the process of the luminance improvement means 47 in which the distribution, on relatively large scale, of the luminance component of the image data being the output of the scale conversion means 46 is used is high. On the other hand, in case other than the inequality (11), the luminance improvement judgment means 45 predicts that the effect in the process of the luminance improvement means 47 in which the distribution, on relatively large scale, of the luminance component of the image data being the output of the scale conversion means 46 is used is low.

Incidentally, a predetermined positive constant C may be added to the above inequality (11), and, in that case, the inequality (11) is modified into $Y'_f + C < Y_{fT}$ (12).

When it is difficult to clearly predict whether or not the effect in the process of the luminance improvement means 47 in which the distribution, on relatively large scale, of the luminance component of the image data being the output of the scale conversion means 46 is used is high, the exposure correction of which the processing cost is low may be performed.

Incidentally, in a case where the human skin representative luminance value is not remarkably low (i.e., dark) as compared with the human skin target luminance value, it is essentially unnecessary to improve the luminance in the face area of the image. In that case, it is needless to say that the luminance improvement judgment means 45 can predict that the effect in the process of the luminance improvement means 47 in which the distribution, on relatively large scale, of the luminance component of the image data being the output of the scale conversion means 46 is used is low.

In the step S206, the parameter for determining the degree of the luminance distribution to be improved is determined according to the prediction result obtained through the steps S203 to S205.

In any case, when it is predicted that the effect in the process of the luminance improvement means 47 in which the distribution, on relatively large scale, of the luminance component of the image data being the output of the scale conversion means 46 is used is low, the parameter γ0 obtained by the equation (7) is output as it is, and the process advances to the step S208.

Meanwhile, when it is predicted that the effect in the process of the luminance improvement means 47 in which the distribution, on relatively large scale, of the luminance component of the image data being the output of the scale conversion means 46 is used is high, the parameter γ which satisfies that the after-correction human skin representative luminance value $Y'_f$ is the target luminance value $Y_{fT}$ after the weighted average is assumed as the parameter representing the degree of improvement. Supposing that an operating result within [ ] described in the denominator of the equation (7) is nearly equal to Y(x, y) and the numerator thereof is replaced with $Y'_f$, the parameter γ can be obtained by the following equation (4).

$$\gamma = 1 - \frac{\log Y_{fT}}{\log Y'_f} \quad (4)$$

Then, the luminance conversion process is performed in the step S208, based on the parameter output in the step S206.

In the step S209, the luminance component improved in the step S208 and the color component converted in the step S202 are synthesized together, and thus the image data is reconstituted.

That is, the color component is first corrected according to the change of the luminance component so that the color of the after-reconstituted image data does not change as much as possible. For example, a ratio Y'(x, y)/Y(x, y) being a before-change/after-change ratio of the luminance component is multiplied respectively to the color components X(x, y) and Z(x, y), and then the R, G and B data are obtained from the X, Y and Z data. Here, it should be noted that that process to be performed here is equivalent to the inverse conversion (transformation) of the conversion to be performed in the process of the step S202. Therefore, the 3×matrix operation and the inverse gamma conversion process are performed to output the eight-bit R, G and B data.

Incidentally, it is needless to say that, when a method of converting RGB into YCbCr is used as the method of extracting the luminance component in the step S202, the corresponding inverse conversion process should be performed.

In the above, the method of optimally improving the brightness distribution according to the image data processed based on the prior art 1 is explained. However, it is needless to say that the present invention is applicable also to the prior arts 2 and 3 in which the luminance component of the digital image and its low-frequency component are used.

Moreover, in the process of the step S208, the bilateral filtering process proposed by Durand et al. in "Fast Bilateral Filtering for the Display of High-Dynamic-Range Images", acm Transactions on Graphics, JULY 2002, Vol. 21, No. 3 may be applied to the luminance component as the value of [ ] described in the denominator of the equation (7). In that case, the bilateral filtering process is performed beforehand to the luminance component in the scale conversion process in the step S207.

In the above, the effect in the process in which the distribution, on relatively large scale, of the luminance component of the image data is used is predicted by analyzing the image data. Besides, for example, it is also possible to predict the effect in the process in which the distribution, on relatively large scale, of the luminance component of the image data is used, by using additional information of a digital camera image described in "Exchangeable Image File Format For Digital Still Camera Standard Exif Version 2.2" issued by JEITA (Japan Electronics and Information Technology Industries Association).

In that case, for example, the additional information of the image data photographed by a digital camera is first analyzed. Then, when it is judged based on such analysis that automatic exposure is not set in an exposure mode, there is a possibility that the user intentionally settled the brightness of the image when photographing it. Thus, it is predicted that the effect in the process in which the distribution, on relatively large scale, of the luminance component of the image data is used is low, whereby it is better not to improve the luminance distribution of the image data.

Further, when the additional information of the image data photographed by the digital camera is analyzed and it is judged based on the analysis that stroboscopic photographing is performed, the possibility of backlight scene is low. Thus, it is predicted that the effect in the process in which the distribution, on relatively large scale, of the luminance component of the image data is used is low, whereby it is better not to improve the luminance distribution of the image data.

Moreover, when the additional information of the image data photographed by the digital camera is analyzed and it is judged based on the analysis that a photographing mode is set to a standard mode or a mode except for a person mode, the possibility that the main subject is a person is low. Thus, it is predicted that the effect in the process in which the distribution, on relatively large scale, of the luminance component of the image data is used is low, whereby it is better not to improve the luminance distribution of the image data.

As above, by analyzing the additional information of the image data photographed by the digital camera, the luminance correction of which the process efficiency is high can be achieved according to need. Incidentally, it is needless to say that the prediction of the effect in the process in which the distribution, on relatively large scale, of the luminance component of the image data is used and which uses the additional information of the image data may be combined with the luminance improvement process for predicting, by analyzing the image data, the effect in the process in which the distribution, on relatively large scale, of the luminance component of the image data is used.

Moreover, in the above, the eight-bit R, G and B data are assumed as the image data to be processed. However, the present invention is also applicable to a case where optimum eight-bit R, G and B image data are reproduced from 16-bit R, G and B image data.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing apparatus comprising:
   a luminance extraction unit that extracts a luminance component from image data;
   a scale conversion unit that obtains a distribution of the luminance component on a relatively large scale;
   a luminance improvement unit that improves the luminance distribution of the image data; and
   an image reproduction unit that reproduces the image data by using an output of said luminance improvement unit as the luminance distribution of a new image,
   wherein a process effect of said luminance improvement unit in which an output of said scale conversion unit is used is predicted,
   when it is predicted that the process effect is high, said luminance improvement unit improves the luminance distribution of the image data by using the output of said scale conversion unit, and
   when it is predicted that the process effect is low, said luminance improvement unit improves the luminance distribution of the image data without using the output of said scale conversion unit.

2. An image processing apparatus according to claim 1, further comprising a backlight detection unit that detects a degree of backlight in the image data,
   wherein the process effect of said luminance improvement unit in which the output of said scale conversion unit is used is predicted based on the degree of backlight detected by said backlight detection unit.

3. An image processing apparatus according to claim 1, further comprising a face detection unit that detects a face area from the image data,
   wherein the process effect of said luminance improvement unit in which the output of said scale conversion unit is used is predicted based on an output of said face detection unit.

4. An image processing apparatus according to claim 3, wherein
   a luminance representative value of the face area is obtained from the luminance distribution of the face area being the output of said face detection unit, and
   when the luminance representative value of the face area is equal to or higher than a predetermined value, it is predicted that the process effect of said luminance improvement unit in which the output of said scale conversion unit is used is low.

5. An image processing apparatus according to claim 4, wherein
   a luminance representative value of an entire image is obtained from the luminance distribution of the image data, and
   the process effect of said luminance improvement unit in which the output of said scale conversion unit is used is predicted based on the luminance representative value of the entire image and the luminance representative value of the face area.

6. An image processing apparatus according to claim 1, wherein
   additional information of the image data is analyzed, and
   when the conclusion of the analysis of the additional information is that automatic exposure is not set in an exposure mode, the improvement of the luminance distribution of the image data is not performed.

7. An image processing apparatus according to claim 1, wherein
   additional information of the image data is analyzed, and
   when the conclusion of the analysis of the additional information is that stroboscopic photographing is performed, it is predicted that the process effect of said luminance improvement unit in which the output of said scale conversion unit is used is low.

8. An image processing apparatus according to claim 1, wherein
   additional information of the image data is analyzed, and
   when the conclusion of the analysis of the additional information is that a photographing mode is set to a standard mode or a mode except for a person mode, it is predicted that the process effect of said luminance improvement unit in which the output of said scale conversion unit is used is low.

9. An image processing method comprising:
   a luminance extraction step of extracting the luminance component from image data;
   a scale conversion step of obtaining the distribution of the luminance component on a relatively large scale;
   a luminance improvement step of improving the luminance distribution of the image data; and
   an image reproduction step of reproducing the image data by using an output in said luminance improvement step as the luminance distribution of a new image,
   wherein a process effect in said luminance improvement step in which an output in said scale conversion step is used is predicted,
   when it is predicted that the process effect is high, said luminance improvement step improves the luminance distribution of the image data by using the output in said scale conversion step, and
   when it is predicted that the process effect is low, said luminance improvement step improves the luminance distribution of the image data without using the output in said scale conversion step.

10. A computer-readable storage medium for storing a computer program instructing the performing of an image processing method comprising:
   a luminance extraction step of extracting a luminance component from image data;
   a scale conversion step of obtaining the distribution of the luminance component on a relatively large scale;
   a luminance improvement step of improving the luminance distribution of the image data; and
   an image reproduction step of reproducing the image data by using an output in said luminance improvement step as the luminance distribution of a new image,
   wherein a process effect in said luminance improvement step in which an output in said scale conversion step is used is predicted,
   when it is predicted that the process effect is high, said luminance improvement step improves the luminance distribution of the image data by using the output in said scale conversion step, and
   when it is predicted that the process effect is low, said luminance improvement step improves the luminance distribution of the image data without using the output in said scale conversion step.

* * * * *